United States Patent [19]
Falcone

[11] 4,059,294
[45] Nov. 22, 1977

[54] ANNULAR METAL FITTING FOR RIGID PLASTIC PART

[75] Inventor: Joseph R. Falcone, DeWitt, N.Y.

[73] Assignee: Syracuse Plastics, Inc., Fayetteville, N.Y.

[21] Appl. No.: 684,765

[22] Filed: May 10, 1976

[51] Int. Cl.² ............................................. F16L 47/02
[52] U.S. Cl. ................................... 285/238; 156/73.1; 285/286
[58] Field of Search ................ 285/21, 238, 239, 423, 285/286, 22; 156/73.1; 228/110, 903

[56] References Cited

U.S. PATENT DOCUMENTS

| | | | |
|---|---|---|---|
| 2,787,480 | 4/1957 | Staller | 285/238 |
| 2,967,067 | 1/1961 | Singer | 285/238 |
| 3,002,871 | 10/1961 | Tramm et al. | 285/21 X |
| 3,602,257 | 8/1971 | Berleyoung et al. | 156/73.1 X |
| 3,728,184 | 4/1973 | Burke et al. | 156/73.1 |
| 3,817,561 | 6/1974 | Kay | 285/238 X |
| 3,817,562 | 6/1974 | Cook et al. | 285/238 |
| 3,944,261 | 3/1976 | Reed et al. | 156/73.1 X |

FOREIGN PATENT DOCUMENTS

| | | | |
|---|---|---|---|
| 201,373 | 12/1958 | Austria | 285/238 |
| 1,227,292 | 10/1966 | Germany | 285/238 |

Primary Examiner—Thomas F. Callaghan
Attorney, Agent, or Firm—Charles S. McGuire

[57] ABSTRACT

An annular metal fitting permanently attached to an outer, cylindrical surface of a rigid plastic part. The metal fitting is tapered inwardly from an inside diameter larger than the outside diameter of the plastic part, to an inside diameter smaller than the part, forming a first annular tooth within the fitting. A second annular tooth is similarly formed, but with an inside diameter less than that of the first-mentioned tooth. Axial grooves in the fitting prevent relative rotation of the fitting and plastic part after joining of the two by ultrasonic welding.

5 Claims, 3 Drawing Figures

ANNULAR METAL FITTING FOR RIGID PLASTIC PART

BACKGROUND OF THE INVENTION

The present invention relates to the art of permanently joining metal and plastic parts and, more particularly, to novel structure of annular metal fittings and methods of affixing the same to an external, cylindrical surface of a rigid plastic part.

One common method of joining a metal piece to a rigid plastic part is the so-called ultrasonic welding process. By imparting high frequency vibrations causing friction between the metal and plastic, localized softening is induced in the plastic, allowing it to flow around or into the metal part. The plastic hardens again very soon after the vibrations are stopped, and the two parts are, in effect, permanently joined.

It is sometimes desirable to place an annular metal fitting on the outside of a plastic tube, or other part having a cylindrical external surface. In U.S. Pat. Nos. 2,967,067 and 2,787,480, for example, a plastic hose or tube is provided with an external fitting of metal having annular teeth sloped inwardly in the direction of insertion of the fitting on the tube. The plastic is of the pliable or resilient type which allows a force fit, the inside diameter of the fitting at the crests of the teeth being somewhat smaller than the external diameter of the plastic tube or hose.

The particular structure of the fittings used for insertion by force fit over a resilient plastic tube, however, are not suitable for joining with a rigid plastic part, by ultrasonic welding or other known processes. It has been the usual practice to use cylindrical parts of rigid or "engineering" type plastics without the benefit of longer wearing external metal fittings because of the difficulty in joining the parts. Although it is more economical to form many parts from molded plastic rather than metal, the useful life of the part may be quite short, particularly where it is subject to friction or abrasion.

It is a principal object of the present invention to provide a novel configuration of annular metal fitting which facilitates permanent connection thereof to a rigid plastic part.

A further object is to provide a method of forming an annular metal fitting and permanently connecting it to an external cylindrical surface of a rigid plastic part.

Other objects will in part be obvious and will in part appear hereinafter.

SUMMARY OF THE INVENTION

In accordance with the foregoing objects, the invention comprises a metal ring having an interior configuration adapted for mating with an initially smooth, external, cylindrical surface or a rigid plastic part. The end of the metal ring which is inserted over the plastic part has an inside diameter slightly larger than that of the plastic, and tapers inwardly at about a 15° angle to a diameter less than that of the plastic. The internal surface of the ring then extends radially to substantially the diameter of the aforementioned end, thus forming an annular tooth having one side sloped and one side straight. A second tooth is similarly formed, having a taper substantially equal to that of the first tooth, but having a smaller inside diameter at the crest.

Additional teeth may be formed, if desirable in particular applications, each identical in configuration and dimensions to the second tooth described above. That is, the tooth nearest the end from which the ring is inserted on the plastic part is larger in diameter at the crest than the other tooth or teeth. The internal surface of the ring is cylindrical over a portion of its length adjacent the end opposite that which is inserted over the plastic part. Criticality of dimensions is discussed more fully in the following detailed description.

The metal ring is placed with the end tapering toward the first tooth in contact with the circular edge of the plastic part at the end of the cylindrical surface. High frequency vibrations are then imparted to the metal ring by means of conventional ultrasonic welding apparatus. The resulting friction between the metal and plastic generates heat sufficient to soften the plastic, allowing it to flow into the annular spaces forming the internal teeth of the ring. Insertion of the ring is continued, with the plastic being progressively softened along its outside surface, until the ends of the metal fitting and plastic are flush with one another, or until the fitting is otherwise at the desired position. The plastic rehardens rapidly when the vibrations are stopped, and the annular spaces between the teeth are completely filled, thereby preventing removal of the ring. Thus, the two pieces are permanently joined and cannot be separated without breakage of one or both. Axial grooves in the cylindrical portion of the internal ring surface may be provided to prevent relative rotational movement of the two pieces.

DETAILED DESCRIPTION

Figure 1:
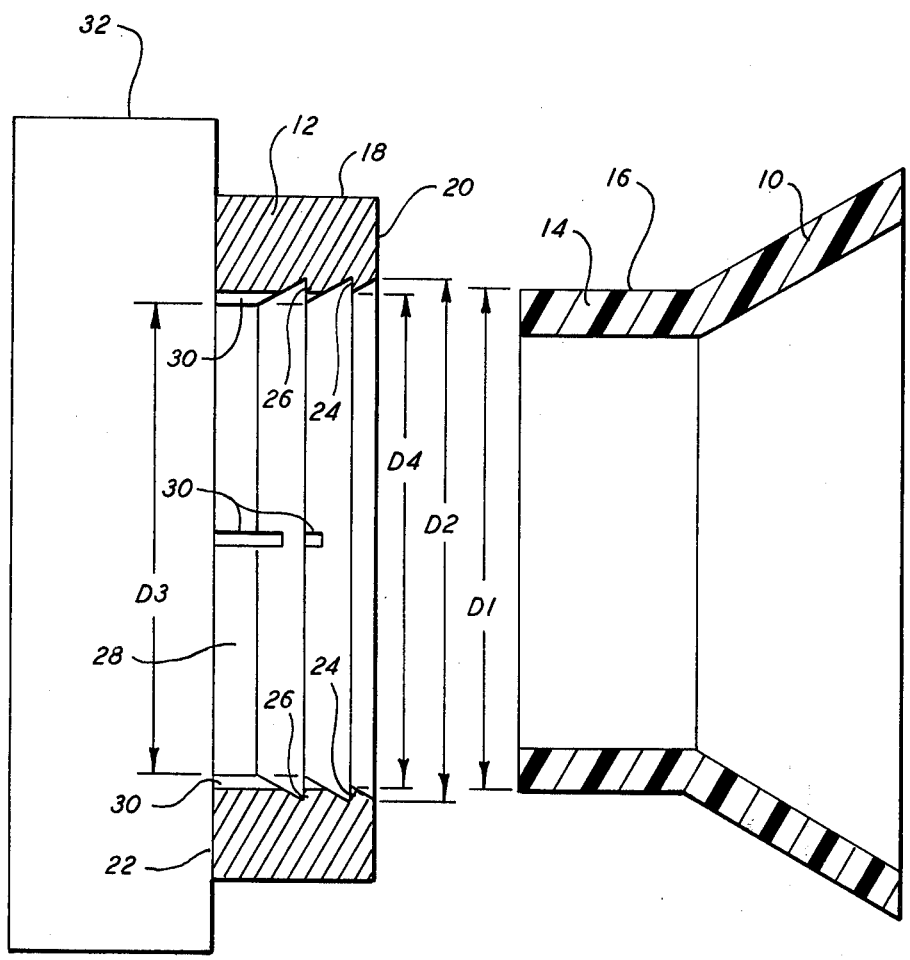
FIG. 1 is an elevational view in half section of the metal fitting of the invention in position to be assembled with a plastic part.

Referring now to the drawing, the reference numerals 10 and 12 generally denote a plastic part and a metal fitting therefor, respectively. Plastic part 10 includes cylindrical portion 14, having an outer surface 16 initially of constant diameter $D_1$. The material from which part 10 is formed is a plastic of the type commonly referred to as "engineering plastics", which includes, for example, Ryton, Noryl, Delrin, Cycolac, etc. Such plastics remain rigid at normal ambient temperatures, but may be softened to the point that they will flow upon heating to a predetermined temperature which may vary depending on the particular formulation of the plastic.

Figure 3:
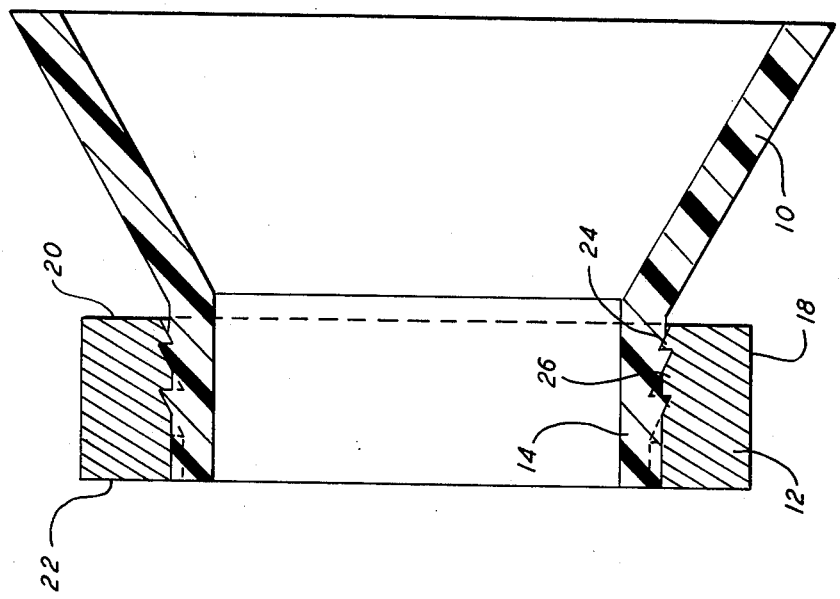
FIG. 3 is an elevational view in half section showing the parts of FIG. 1 after being permanently joined.

The present invention is not limited by the configuration or intended use of part 10, other than the fact that it includes a portion having the aforementioned external cylindrical surface, to which an annular metal fitting is to be joined. The particular part shown in FIGS. 1 and 3 is a portion of a centrifugal pump and is rotated during pump operation while immersed in the fluid being pumped. A typical application of such pumps is in drilling operations wherein dirt, sand, or other abrasive particles are likely to be present in the water or other fluid being pumped. In conventional constructions the cylindrical portion of the illustrated pump part is rotated within a stationary tube. Abrasive particles which pass between the relatively moving cylinder and tube cause rapid deterioration of the plastic part, necessitating frequent replacement for continued pump operation.

Metal fitting 12 is formed generally as a ring having a smooth external surface 18, a first end 20 having an inside diameter $D_2$, and a second end 22 having an inside diameter $D_3$. From end 20 the inside surface of fitting 12 tapers inwardly at an angle of preferably about 15° with respect to the axis of the fitting to a diameter $D_4$. The surface then extends radially of the fitting, thereby forming annular tooth 24, having one surface tapered toward end 20 and the other normal to the ring axis. The crest of tooth 24 has a diameter $D_4$, and the diameter at the outer end of the radial surface having a diameter equal to that at end 20, i.e., $D_2$.

Figure 2:
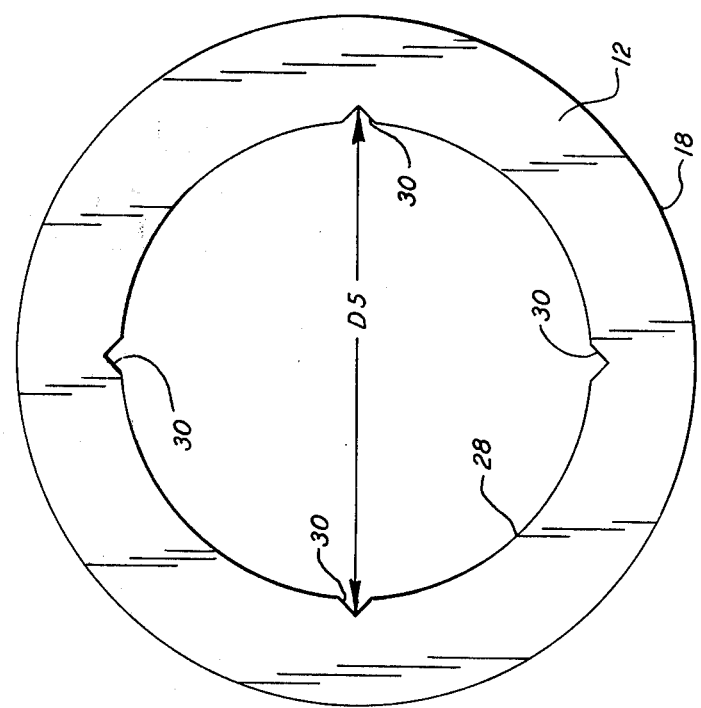
FIG. 2 is a full plan view of the metal fitting.

The surface is again tapered inwardly and extended radially to form second tooth 26 having a diameter $D_3$ at the crest. The tapered surface of tooth 26 is at the same, or substantially the same, angle as that of tooth 24 but extends further so that $D_3$ is smaller than $D_4$. Additional teeth may be formed, if desired, each identical to tooth 26; that is, if any additional teeth are formed, the angle and length of the tapered surface is the same, each tooth having a diameter $D_3$ at the crest. After the last tooth, the surface is again tapered to diameter $D_3$ and then extends at constant diameter to end 22, forming internal cylindrical surface 28. Grooves 30 are formed in surface 28, extending axially of fitting 12 and may be in the form of a V-notch, as shown in FIG. 2, or of other desired cross section.

The plastic part and metal fitting formed in the above-described configuration, are joined by the well-known ultrasonic welding process. The fitting is placed concentrically with the cylindrical portion of the plastic part, with the outer edge of the plastic contacting the tapered surface of the fitting at end 20 thereof. Through the horn of the ultrasonic welding apparatus, indicated diagrammatically in FIG. 1 by reference numeral 32, high frequency vibrations (e.g., 20,000 cycles per second) are imparted to fitting 12, thereby causing friction between the metal and plastic which generates heat sufficient to soften the plastic to a flowable state. Pressure is also applied to the fitting, urging it over the end of the cylindrical portion of the plastic part, as the softened plastic material flows over teeth 24 and 26, into the annular grooves forming the teeth and into axial grooves 30. When fitting 12 has been inserted to the extent that end 22 thereof is flush with the end of cylindrical portion 14 of plastic part 10 the vibrations are stopped and the plastic quickly rehardens. The outer surface of portion 14 now conforms to the inside configuration of fitting 12, as shown in FIG. 3, and the metal and plastic parts are permanently joined.

As previously mentioned, the tapered surface of teeth 24 and 26 is preferably about 15° with respect to the ring axis. As minimum and maximum limits, in order to achieve the desired fit, the angle must be between 8° and 18°. The internal diameter of ring 12 at the point between two teeth, i.e., at the outside of the radial surfaces defining one side of the teeth, should be at least as large as $D_1$ and not greater than $D_2$. Grooves 30 extend through the crests of all teeth, as well as through internal cylindrical surface 28, and have a depth sufficient to provide rotational locking under anticipated loads.

The internal surface of the ring must be provided with at least two annular teeth, as in the disclosed embodiment, although additional teeth may be provided, and the inside diameter at the crest of the tooth nearest the end into which the plastic part is inserted (dimension $D_4$ in the disclosed embodiment) must be greater than the inside diameter at the crest of the remaining teeth (dimension $D_3$). If there is no difference in the diameter at the crest of the first tooth and that at the crest of the remaining teeth the plastic is likely to flow through the ring without filling the spaces between the crests of the teeth.

The amount of interference fit between the outside of the plastic part and the metal ring at the tooth crests is a function of the particular materials used and the amount of anticipated axial and radial load to which the parts will be subjected. Typically, dimension $D_3$ should be approximately 0.020 inches smaller than dimension $D_1$, and dimension $D_4$ should be 0.010 to 0.015 inches smaller than dimension $D_1$. Thus, the difference in diameter between $D_3$ and $D_4$ is $\frac{1}{4}$ to $\frac{1}{2}$ the interference dimension between the plastic part ($D_1$) and the internal cylindrical surface (28) of the metal ring ($D_3$). The dimension across the inside of the fitting between the extremities of two opposing grooves, indicated in FIG. 2 as dimension $D_5$ is not critical, but the depth of the grooves should not exceed $\frac{1}{3}$ of the ring thickness, i.e., the dimension radially through the ring between surfaces 18 and 28.

What is claimed is:

1. The combination comprising:
   a. a rigid plastic part having an end portion with a cylindrical external surface of a first diameter;
   b. an annular metal fitting having first and second ends and an internal bore extending therethrough to define an internal surface;
   c. said fitting being of a second diameter at said first end and a third diameter at said second end;
   d. said internal surface sloping inwardly from said first end, around the entire periphery thereof, at a predetermined angle of between 8° and 18° to a fourth diameter, said first diameter being smaller than said second diameter and larger than said third and fourth diameters, said fourth diameter being larger than said third diameter;
   e. said internal surface extending radially outward from said fourth diameter to a diameter equal to said second diameter, thence sloping inwardly at substantially said predetermined angle to said third diameter, thence extending radially outward to said second diameter, thence sloping inwardly at substantially said predetermined angle to said third diameter, thence extending axially at said third diameter to said second end, thereby forming a plurality of teeth and grooves; and
   f. ultrasonic welding means for permanently joining said plastic part and metal fitting with said external surface opposing said internal surface over the entire area of the latter, whereby high frequency vibrations causes friction between the metal fitting and the plastic part which generates sufficient heat to soften the plastic part to flow around the teeth and into the grooves.

2. The invention according to claim 1 wherein said predetermined angle is approximately 15°.

3. The invention according to claim 1 and further including at least one groove extending into said internal surface from said third diameter to a predetermined depth.

4. The invention according to claim 3 wherein said groove extends axially through said fitting between said first and second ends.

5. The invention according to claim 1 wherein the difference between said third and fourth diameters is between one-fourth and one-half the difference between said third and said first diameters.

* * * * *